Oct. 9, 1956
P. H. DIXON
2,765,672
ACCELERATOR HOLDING DEVICE
Filed March 27, 1953
2 Sheets-Sheet 1
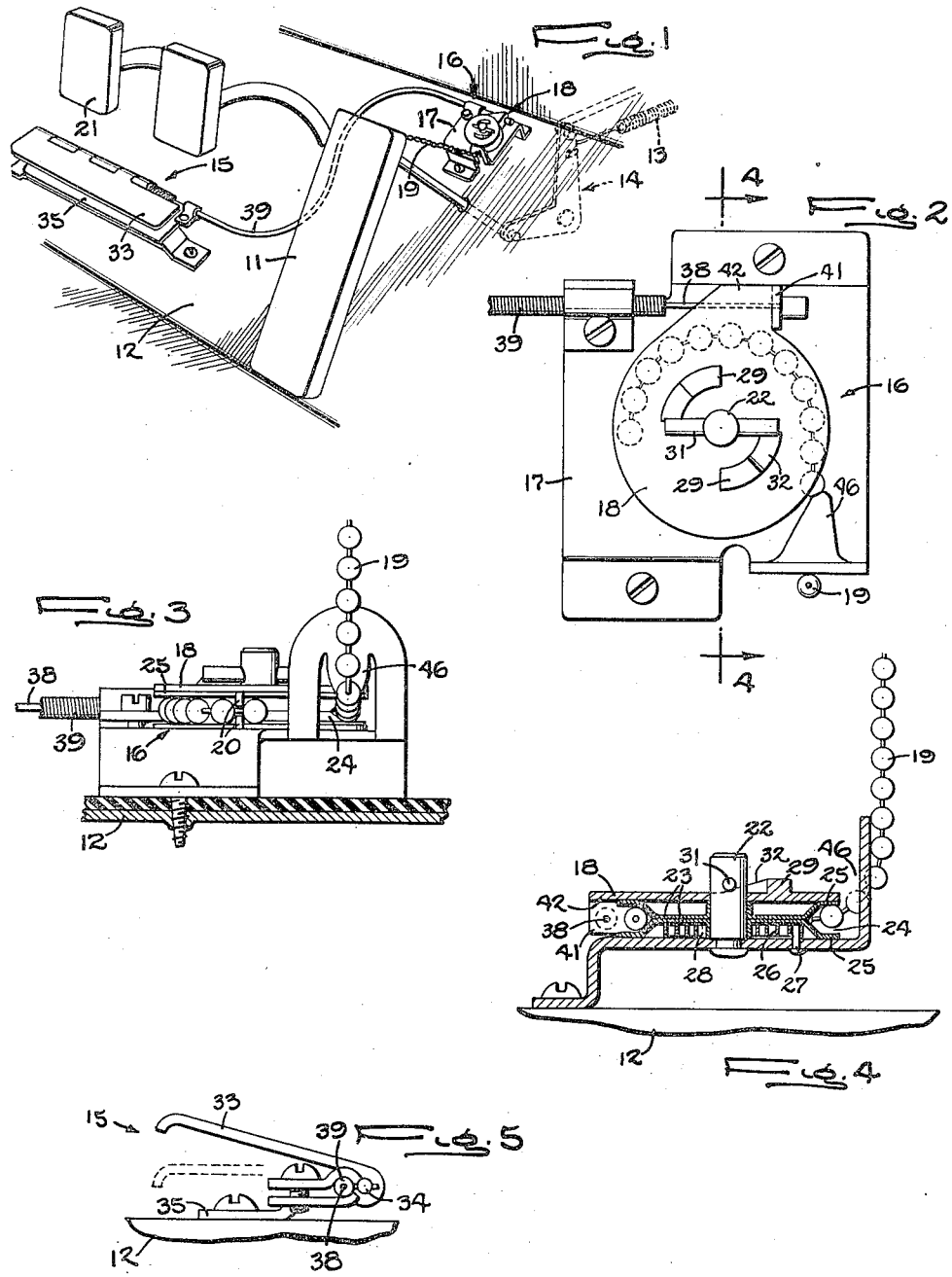
INVENTOR
Paul H. Dixon
By Carlsen, Pelgner Hubbard & Wolfe
ATTORNEY Oct. 9, 1956    P. H. DIXON    2,765,672
ACCELERATOR HOLDING DEVICE
Filed March 27, 1953    2 Sheets-Sheet 2
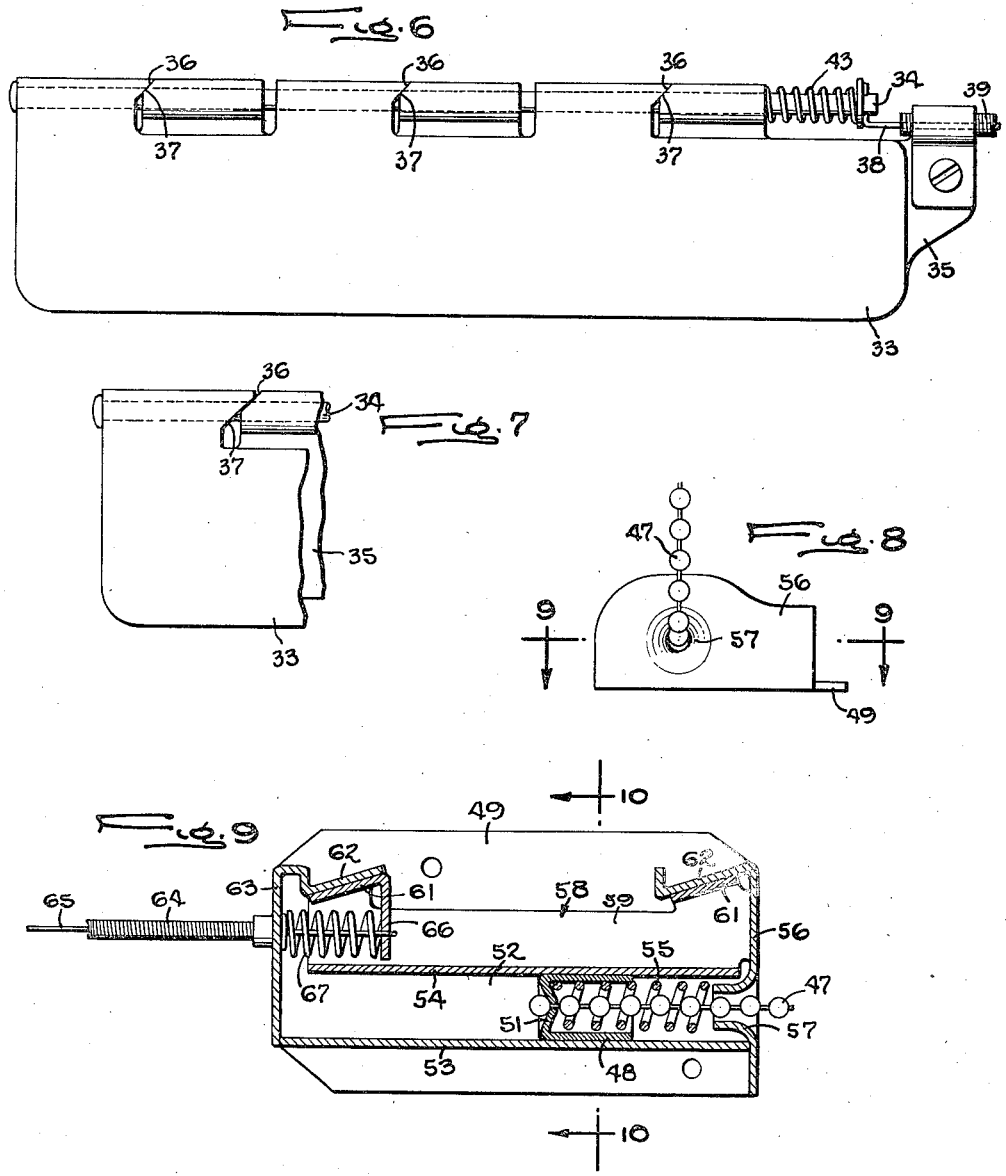
INVENTOR
Paul H. Dixon
By Carlson, Pitzner, Hubbard & Wolfe
ATTORNEY United States Patent Office 2,765,672
Patented Oct. 9, 1956

2,765,672

ACCELERATOR HOLDING DEVICE

Paul H. Dixon, Rockford, Ill., assignor to Dixon Research, Inc., Rockford, Ill., a corporation of Illinois Application March 27, 1953, Serial No. 345,094

11 Claims. (Cl. 74—513)

This invention relates to a device for holding the accelerator foot pedal of an automobile or other vehicle in a depressed position against the action of its return spring to permit the driver to remove the pressure of his accelerator actuating foot from the pedal and thereby relieve fatigue in his leg while maintaining a constant speed of the vehicle.

The primary object of the invention is to provide a novel device of the above character which is operable selectively to hold an accelerator pedal in any depressed position throughout its range of movement.

Another object is to achieve the foregoing object through the provision of a novel friction clamp which may be activated by a slight pressure of the driver's left foot and deactivated simply by release of such pressure.

A further object is to connect the clamp to the accelerator pedal in a novel manner to permit the pedal to be depressed beyond a selected position in which the clamp is energized, as may be desired in passing other vehicles, and returned to such position without disturbing the setting of the clamp.

A more detailed object is to connect the clamp to the accelerator pedal by an elongated flexible element such as a chain which, when the pedal is in a depressed position and the clamp is energized, is maintained in tension to prevent movement of the pedal toward its released position but is collapsible to permit the pedal to be depressed farther from its released position without effecting the setting of the clamp.

The invention also resides in the novel construction of the clamp for energization thereof by a slight movement of an actuator by the driver's left foot and for reducing the space occupied by the clamp while enabling it to be used with different accelerator pedals having widely varying ranges of movement.

Other objects and advantages of the invention will become apparent from the following detailed description taken in connection with the accompanying drawings, in which Figure 1 is a perspective of a clamping device and its actuator embodying the novel features of the present invention and shown in their relation to the pedals of a vehicle.

Fig. 2 is a plan view of the device.

Fig. 3 is a side elevational view of the device.

Fig. 4 is a sectional view taken along the line 4—4 of Fig. 2.

Fig. 5 is an end elevational view of the actuator for the device.

Fig. 6 is a plan view of the actuator.

Fig. 7 is a fragmentary view similar to Fig. 6 with the parts in different positions.

Fig. 8 is a front elevational view of a modified form of the invention.

Fig. 9 is a sectional view of the modification taken along the line 9—9 of Fig. 8.

Fig. 10 is a sectional view taken along the line 10—10 of Fig. 9.

The device shown in the drawings to illustrate the present invention is especially adapted for use with the throttle actuating mechanism of an automobile or other vehicle and is operable selectively to hold the accelerator pedal 11 thereof in a depressed position between the vehicle floorboard 12 and a released position (see Fig. 1) which is spaced from the floorboard and toward which the pedal is yieldably urged by a return spring 13 acting between the vehicle chassis and the linkage 14 connecting the pedal to the throttle (not shown). The improved holding device includes a member 16 movable relative to a stationary base 17 and back and forth toward and away from an inactive position (see Fig. 2) corresponding to the released position of the accelerator pedal. A clamping element 18 mounted on the base is engageable with the member 16 and, when activated after the member 16 has been moved away from its inactive position, is operable to apply a frictional gripping force to the member and hold the latter against return to the inactive position. Through a connection 19 with the throttle actuating mechanism, herein the upper end of the pedal itself, the oscillatory member moves toward and away from its inactive position in the movement of the pedal toward and away from its released position. Thus, activation of the clamping element after the pedal has been depressed from its released position and the member 16 has moved from its inactive position results in securing the member against return to the inactive position and in holding the pedal in a depressed position against the action of the return spring 13. Preferably, the clamping element is activated by a manually movable actuator 15 located at a point remote from the accelerator pedal as on the floorboard adjacent the vehicle clutch pedal 21. Thus, the vehicle driver may hold the accelerator pedal depressed to maintain a selected speed of the vehicle with his left foot while removing the pressure of his right foot from the pedal and thereby relieving fatigue in his right leg.

To enable the vehicle driver to retain some control over the accelerator pedal 11 with his right foot while the clamping element 18 is activated and the member 16 is held against return to its inactive position, the holding device is constructed in a novel manner to permit the pedal to move farther beyond the position in which it is held by the clamp and then return to the same position without deactivating the clamping element or disturbing the setting of the latter. For this purpose, the connection 19 is an elongated flexible element operable in tension between the pedal and the wheel to hold the pedal in a depressed position against return to its released position when the clamping element 18 is activated, but collapsible to permit the pedal to move relative to the member 16 first farther away from its released position and then back to the depressed position without deactivating the clamp. Such action is particularly desirable where the driver, after selecting a desired speed and activating the clamp, desires to accelerate briefly as in passing other vehicles or ascending hills and then resume the original selected speed.

In the preferred form of the invention shown in Figs. 1–7, the base 17 is a plate adapted to be secured as by screws flat against the floorboard 12 behind the accelerator pedal 11 and having a stud 22 projecting normally and rigidly from its upper side. The oscillating member 16 is a grooved wheel or sheave comprising two rigidly attached annular disks 23 which are journaled on the stud 22 for movement back and forth about the latter on an arcuate path and the lower one of which is in sliding contact with the base. Peripheral flanges 25 on the disks cooperate to define an outwardly and radially facing groove 24 receiving the flexible connecting element 19 which herein is a ball chain.

The chain 19 is secured at its outer end in any suitable manner to the free end of the pedal 11 and, at its inner end, is secured between lugs 20 bent inwardly from the flanges 25 as shown in Fig. 3. From the lugs 20, the chain extends around the groove 24 in a clockwise direction and through an arcuate guide 46 rigid with the base 17 and curving upwardly from the groove toward the accelerator pedal to facilitate movement of the chain back and forth with the wheel 16 and into and out of the groove. To take up slack in the chain as the accelerator pedal is depressed with the clamp deactivated, a spiral spring 26 coiled around the hub of the wheel and disposed between the latter and the base 17 acts between a lug 28 (Fig. 4) bent down from the bottom disk 23 and a pin 27 rigid with the base to urge the wheel in a counterclockwise direction and away from its inactive position shown in Fig. 2. This spring is weaker than the pedal return spring 13 to permit the pedal to return to its released position when the clamp is deactivated.

In the present instance, the clamping element 18 is a flat ring journaled on the stud 22 above the wheel 16 and in sliding contact with the flange 25 on the upper disk 23. When the ring is turned relative to the base 17 and into its active position, it is moved axially toward the wheel to clamp the latter against the base. Such movement of the clamping ring 18 is effected by coacting cam and follower surfaces 29 and 31 on the ring and the base plate 17. Herein, the cam 29 is formed on the upper side of the ring and has axially facing arcuate surfaces cooperating with a stationary pin 31 projecting radially from opposite sides of the stud and constituting the follower. In the inactive position of the clamping ring, the follower pin engages the top surface of the ring. As the latter is rotated toward its active position and away from the inactive position shown in Fig. 2 however, the follower pin engages a rise 32 on the cam and the ring is pressed downwardly toward the base plate to clamp the wheel against the latter. To enable the wheel to be clamped securely to the base with only a small angular movement of the ring, the rise 32 is formed as a fairly steep inclined plane. Upon rotation of the ring in a clockwise direction away from its active position, the cam surface 32 moves out from under the follower to relieve the downward pressure on the ring and the wheel 16 and thereby release the wheel for rotation relative to the base.

Rotation of the clamping ring 18 to its active position preferably is effected in response to a slight pressure of the driver's left foot on the actuator 15 while rotation in the opposite direction to relieve the clamping pressure is effected in response to removal of such pressure. For this purpose, the actuator includes a member 33 normally urged toward an inoperative position (see Fig. 1) in which the clamp is deactivated but operable, when moved out of the inoperative position and into an operative position shown in phantom in Fig. 5, to move the clamping ring to its active position. In this instance, the actuator member 33 is an elongated flat plate hinged by a pin 34 to a stationary support plate 35 for swinging toward and away from its operative position alongside the support plate. During such swinging, the actuator plate is is shifted endwise to move the hinge pin axially, this motion of the hinge pin being transmitted to the clamping ring through the center wire 38 of a flexible cable.

To shift the hinge pin 34 axially, the actuator plate 33 is secured to the pin and barrel cam and follower surfaces 36 and 37 (Figs. 6 and 7) are formed on the parts of the actuator and support plates encircling the pin. These surfaces coact to shift the actuator plate and the pin to the left as viewed in Figs. 6 and 7 when the plate is swung downwardly toward the support plate and to swing the actuator plate upwardly when the plate and the pin are shifted to the right. Such shifting to the right and upward swinging of the actuator plate in response to removal of pressure from the plate is effected by a coiled contractile spring 43 which encircles the hinge pin and acts between the support plate and one end of the cable center wire 38 extending through a transverse hole in the pin. The other end of the center wire is secured to a lug 41 bent down from a projection 42 on the clamping ring 18 and the cable cover 39 is secured at opposite ends to the base 17 and the support plate 35 respectively. Thus, when the hinge pin 34 is moved axially with the actuator plate, the clamping ring is rotated through a corresponding angle about the stud 22.

Assuming that the actuator plate 33 and the clamping ring 18 are in their inoperative and inactive positions respectively and that no pressure is applied to the pedal 11, the latter will be urged by its return spring 13 toward its released position and slack in the chain 19 will be taken up by rotation of the wheel 16 in a counterclockwise direction under the action of the spiral spring 26. When the accelerator pedal is depressed, the wheel will rotate in the same direction to take up the chain slack until the clamping ring is energized. This occurs in response to a downward pressure on the actuator plate 33 to depress the latter and move the hinge pin 34 and the cable wire 38 axially against the action of the spring 43 to rotate the clamping ring to its active position. In such rotation, the ring follows an arcuate path extending along the arcuate path of the wheel and is urged transversely of such paths and axially and downwardly against the wheel by the cam surface 32 to clamp the wheel frictionally against the base plate 17. The chain is then prevented from unwinding and acts to hold the pedal against movement back to its released position thereby permitting the driver to remove the pressure of his right foot from the pedal.

Although the chain 19 prevents movement of the pedal 11 to its released position when the clamp is activated, it is collapsible to permit further depression of the pedal beyond the position selected by activation of the clamp. This enables the driver to accelerate the vehicle by depressing the pedal with his right foot beyond the selected position without releasing the clamp, the pedal returning to the same selected position when the driver again removes his right foot from the pedal.

Release of the accelerator pedal for movement upwardly into its released position is effected simply by removing the pressure of the driver's left foot from the actuator plate 33. This permits the actuator plate to swing upwardly and the hinge pin 34 and the center cable wire 38 to move axially and to the right under the action of the coil spring 43 to rotate the clamping ring 18 in a clockwise direction as viewed in Fig. 2 and into its inactive position thereby releasing the wheel. The latter is then free to rotate relative to the base 17 permitting the chain 19 to unwind and the pedal to return to its released position under the action of the spring 13, the wheel spring 26 continuing to urge the wheel in a direction to take up the slack in the chain.

The modified form of the invention shown in Figs. 8–10 is especially adapted to be made from sheet metal stampings. In this form, a chain 47 which is secured at its outer end to the pedal 11 as described above is connected at its inner end to a slide 48 mounted on a base 49 to reciprocate in a straight line path and toward and away from an inactive position shown in Fig. 9 and corresponding to the inactive position of the wheel 16. Herein, the slide is a sheet metal stamping of U-shaped cross section having lugs 51 bent in at one end to hold the inner end of the chain. The base 49 is a flat plate adapted to be secured to the floorboard under the pedal and having a guideway 52 for the slide defined by laterally spaced parallel walls 53 and 54 upstanding from the base. A coiled contractile spring 55 surrounding the chain and compressed between the lugs 51 on the slide and a bent up end portion 56 of the base 49 yieldably urges the slide away from its inactive position to take up slack in the chain. To facilitate movement of the chain with the slide, the chain extends inwardly to the slide through an outwardly flaring opening 57 formed in the bent up end portion 56 of the base.

One wall 53 of the guideway is formed on a separate stamping of L-shaped cross section having its other leg secured as by welding to the base 49. The other wall 54 of the guideway 52 is the upstanding leg of another stamping 58 of L-shaped cross section whose other leg 59 is parallel to and slidable along the base. The L-shaped stamping 58 constitutes the clamping element and is movable back and forth along a path extending longitudinally of the path of the slide 48. During such movement of the clamping element to the left as viewed in Fig. 9, follower lugs 61 bent up from the other leg 59 of the clamping element engage cam lugs 62 bent in from the end portion 56 of the base and another bent up portion 63 at the opposite end of the base to urge the clamping element transversely of the path of the slide and into clamping engagement with the latter. During movement of the clamping element to the right, however, the clamping pressure is relieved and the slide is released for movement along the base.

Such movement of the clamping element 58 may be effected by an actuator similar to that described above connected to the element by a cable having a covering 64 secured to the bent-up end portion 63 of the base. A center wire 65 of the cable is secured at its inner end to an arm 66 on the clamping element integral with one follower 61. A compression spring 67 surrounding the wire and acting between the base and the arm 66 urges the clamping element to the right and into its inactive position shown in Fig. 9 in which the slide may reciprocate along the guideway. To hold this slide in the guideway 52 and the clamping element 58 against movement upwardly away from the base 49, a cover plate (not shown) parallel with the base and disposed above the slide and the clamping element may be secured to the base in any suitable manner.

In the operation of the modified form of the invention, depression of the accelerator pedal 11 with the clamping element 58 in its inactive position as shown in Fig. 9 results in movement of the slide 48 under the action of its spring 55 to the left away from its inactive position to take up the slack in the chain. When the clamping element is moved to the left by axial movement of the center wire 65, the cams 62 urge the element 58 toward the slide to clamp the latter between the guide walls 53 and 54 and thereby hold the pedal in a depressed position. The pedal is released to move outwardly away from the floorboard by removal of the tension from the center wire 65 to permit the clamping element to move to the right under the action of its spring 67 and out of clamping engagement with the slide.

It will be apparent from the foregoing that, by clamping the oscillating member 16 to the base 17 frictionally, it is possible to hold the accelerator pedal 11 depressed in any position throughout its range of movement. The novel manner of connecting the oscillating member to the pedal enables the driver to select a desired position of the pedal, depress the latter beyond that position for accelerating the vehicle, and then return the pedal to the same position all without disturbing the clamp. Thus, some control over the pedal by the driver's right foot is retained even while the clamping element is actuated. This, plus the fact that the clamping element 18 and actuator plate 33 are yieldably urged toward their inactive positions for release of the clamping element simply by removal of the driver's left foot from the actuator contribute to the safety of the device and thereby add to its commercial practicability. With the rotary oscillating member 16 shown in Figs. 1–7 and the flexible connection 19 between the latter and the pedal, the device occupies a small space and yet is adapted for use with pedals having widely varying ranges of movement.

I claim as my invention:

1. In a device for holding a vehicle accelerator pedal in a depressed position, the combination of, a base adapted to be secured to a vehicle chassis behind the accelerator pedal thereof, a member mounted on said base for movement in a predetermined path back and forth and toward and away from an inactive position and adapted to be connected to the accelerator pedal for movement away from its inactive position in the movement of the pedal away from its released position and into a depressed position, a clamping element mounted on said base for movement toward and away from an active position along a path extending along and spaced laterally from said member path, and cam and follower surfaces on said base and said element engageable with each other in the movement of the latter toward said active position and operable to urge the element transversely of said paths and toward said member into frictional gripping engagement with the member to clamp the same against movement relative to the base.

2. In a device for holding a vehicle accelerator pedal in a depressed position, the combination of, a base adapted to be secured to a vehicle behind the accelerator pedal thereof, a member mounted on said base for movement in a predetermined path back and forth and toward and away from an inactive position and adapted to be connected to the accelerator pedal for movement away from its inactive position in the movement of the pedal away from the released position of the latter and into a depressed position, a clamping element mounted on said base for movement toward and away from an active position along a path extending along and spaced laterally from said member path, means engageable with said element in the movement of the element into said active position and operable to move the element transversely of said path thereof and into frictional gripping engagement with said member, an actuator connected to said element and operable when moved to an operative position to move the element along said path thereof and into said active position, and means yieldably urging said actuator away from said operative position.

3. In a device for use with an accelerator pedal of a vehicle, the combination of, a base adapted to be secured to the vehicle chassis behind the accelerator pedal, a member mounted on said base to move back and forth toward and away from an inactive position, an element connected to said member and adapted for connection with the accelerator pedal for movement of the member away from said inactive position when the pedal is depressed from its released position and for holding the pedal in a depressed position when the member is clamped against movement relative to the base, a clamping element mounted on said base for movement toward and away from said member and into and out of frictional gripping engagement therewith to clamp the member against movement relative to the base, and an actuator located remotely from and connected to said clamping element and movable independently of the accelerator pedal toward and away from an operative position in which the actuator is operable to move the clamping element toward said member and into frictional gripping engagement therewith to hold the member against movement relative to the base.

4. In a device for holding a vehicle accelerator pedal in a depressed position, the combination of, a base adapted to be secured to a wall of a vehicle behind the accelerator pedal thereof, a first element on said base adapted to be connected to the accelerator pedal for movement with the latter into a depressed position and operable when clamped against the base to hold the pedal in the depressed position, a clamping element mounted on said base for movement back and forth toward and away from an active position and operable when moved toward the latter to clamp said first element against said base, a first member adapted to be secured to the vehicle floorboard adjacent the operator's left foot, a second member pivotally connected to said first member for movement toward and away from the latter, cam and follower surfaces on said members operable in a closing movement of the members to move the second member relative to the first member and axially of the pivot, a flexible cable connecting said second member and said clamping element for movement of the latter toward said active position when said second member is moved toward said first member, and means yieldably urging said members apart.

5. In a device for holding a vehicle accelerator pedal in a depressed position, the combination of, a base adapted to be secured to a vehicle behind the accelerator pedal thereof and having a clamping surface thereon, a clamping element spaced laterally from said surface and mounted on said base to rotate back and forth toward and away from an active position, a member mounted between said element and said surface for rotation about the axis of the clamping element and toward and away from an inactive position, an elongated flexible connection having one end secured to said member and its other end adapted to be connected to said accelerator pedal, means yieldably urging said member away from said inactive position to wind said flexible element about the periphery of the member and take up slack in the flexible element when the pedal is moved from a released position to a depressed position, and coacting cam and follower surfaces on said base and said clamping element operable in the movement of the latter toward said active position to urge the clamping element axially toward the member and clamp the member frictionally against said surface on the base and thereby hold the pedal in said depressed position thereof.

6. In a device for holding a vehicle accelerator pedal in a depressed position, the combination of, a base adapted to be secured to a vehicle adjacent the accelerator actuating mechanism thereof and having a straight guide surface thereon, a clamping member having a straight surface thereon parallel to said base surface and cooperating with the latter to define a guideway, a slide mounted in said guideway to reciprocate toward and away from an inactive position and adapted to be connected to said accelerator mechanism for movement away from its inactive position in the movement of the accelerator pedal away from its released position and into a depressed position, means mounting said clamping member on said base for broadwise oscillating movement of said guide surface thereon toward and away from an active position in which said slide is clamped between said guide surfaces and held against movement relative to the base, and means yieldably urging said member away from said active position.

7. In a device for controlling the position of an accelerator pedal of a vehicle, the combination of, a base adapted to be secured to the vehicle chassis, a member adapted for connection with the accelerator pedal and mounted on said base for movement toward and away from a released position in the movement of the pedal toward and away from a released position, a clamping element on said base adapted for frictional gripping engagement with said member and operable when actuated to clamp the member against movement relative to the base, an actuator spaced from said clamping element and movable between active and inactive positions, a connection between said actuator and said clamping element for actuating the latter when the actuator is moved to said active position and releasing the element for movement of said member relative to said base when the actuator is moved into said inactive position, and means yieldably urging said actuator into said inactive position thereof.

8. In a device for holding a vehicle accelerator pedal in a depressed position, the combination of, a base adapted to be secured to the vehicle floorboard behind the accelerator pedal, an element mounted on said base for movement toward and away from an inactive position and adapted to be connected to the pedal for movement away from said inactive position when the pedal is moved away from its released position and into a depressed position, a clamp on said base operable when actuated to hold said element against movement relative to the base, an actuator for activating said clamp having a connection with the latter and adapted to be positioned on the vehicle floorboard adjacent the operator's left foot, said actuator having a member movable toward and away from the vehicle floorboard and operable when moved toward the latter by pressure of the operator's left foot to activate said clamp and when moved away from the board to release the clamp, and means yieldably urging the member away from the floorboard whereby the clamp is released in response to removal of the pressure of the operator's left foot from the member.

9. In a device for holding the accelerator pedal of a vehicle in a depressed position, the combination of, a base adapted to be secured to the vehicle chassis, a member adapted for connection with the accelerator pedal and movable with the latter relative to the base and toward and away from an inactive position corresponding to the released position of the pedal, means mounted on said base and operable when activated after movement of the pedal to a depressed position and movement of said member a corresponding distance away from said inactive position to clamp the member against return to the inactive position and thereby hold the pedal against return to said released position, an actuator for said clamping means movable toward and away from an operative position and operable to activate the clamping means when moved into the operative position and to release the clamping means when moved out of the operative position, and means yieldably urging said actuator away from said operative position thereof.

10. In a device for holding an accelerator pedal of a vehicle in a depressed position below its released position, the combination of, a generally flat base adapted to be secured to and lie against the vehicle floorboard behind the accelerator pedal, a wheel mounted on said base to rotate back and forth toward and away from an inactive position about an axis extending substantially normal to the base and the vehicle floorboard, means yieldably urging said wheel away from said inactive position, a clamp operable when activated to hold said wheel against rotation relative to said base, an elongated flexible element adapted to be wound around the periphery of said wheel in the rotation of the latter away from said inactive position and having one end secured to the wheel and its other end adapted for connection with the accelerator pedal, and a curved member secured to said base and extending first tangentially away from the periphery of said wheel and then axially of the latter to guide said flexible element in its winding movement onto and off of the wheel.

11. For use with a vehicle accelerator pedal normally urged toward a released position by a spring, the combination of, a generally flat base adapted to be secured to and to lie along the vehicle floorboard behind the accelerator pedal, a member mounted on said base for movement toward and away from an inactive position along a path parallel to the base and the floorboard, a curved guide element secured to said base and extending first along said path and then laterally of the path away from the base and toward the accelerator pedal, an elongated flexible element having one end connected to said member and its other end adapted for connection with the pedal, the intermediate portion of said flexible element lying in and movable along said guide element in the movement of said member back and forth on said base, resilient means acting between said base and said member and yieldably urging the latter away from said inactive position to take up slack in said element when the pedal is depressed from said released position, and a clamp mounted on said base and operable when energized to hold said member against movement relative to the base.

References Cited in the file of this patent

UNITED STATES PATENTS

| | | |
|---|---|---|
| 1,449,390 | Forse | Mar. 27, 1923 |
| 1,490,144 | Taylor | Apr. 15, 1924 |
| 2,159,772 | Schroedter | May 23, 1939 |
| 2,258,625 | Rubissow | Oct. 14, 1941 |
| 2,270,002 | Glick | Jan. 13, 1942 |
| 2,638,016 | Munson | May 12, 1953 |